United States Patent
Lu et al.

(10) Patent No.: US 10,216,309 B2
(45) Date of Patent: Feb. 26, 2019

(54) TOUCH SCREEN THAT INCLUDES A PLURALITY OF STRAIN SENSORS

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Feng Lu, Shanghai (CN); Liang Liu, Shanghai (CN); Shaolong Ma, Shanghai (CN); Qijun Yao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 238 days.

(21) Appl. No.: 15/166,582

(22) Filed: May 27, 2016

(65) Prior Publication Data

US 2017/0185205 A1 Jun. 29, 2017

(30) Foreign Application Priority Data

Dec. 24, 2015 (CN) .......................... 2015 1 0990426

(51) Int. Cl.
*G06F 3/041* (2006.01)
(52) U.S. Cl.
CPC ................. *G06F 3/0414* (2013.01)
(58) Field of Classification Search
None
See application file for complete search history.

(56) References Cited

U.S. PATENT DOCUMENTS 8,780,074 B2 7/2014 Castillo et al.
2010/0123686 A1* 5/2010 Klinghult .............. G06F 3/0412
345/178

(Continued)

FOREIGN PATENT DOCUMENTS

CN 101482435 A 7/2009
CN 101593059 A 12/2009

(Continued)

OTHER PUBLICATIONS

CN First Office Action dated Feb. 24, 2018 in the corresponding Chinese application(application No. 201510990426.0).

*Primary Examiner* — Abdul-Samad A Adediran
*Assistant Examiner* — Kirk W Hermann
(74) *Attorney, Agent, or Firm* — Kilpatrick Townsend & Stockton LLP

(57) ABSTRACT

A touch screen is provided. The touch screen includes a first strain sensor located in a first region, a second strain sensor located in a second region, a first power supply and a first voltage detector. The first region is surrounded by the second region, the first power supply is configured to provide an operating voltage to the first strain sensor and the second strain sensor. The first voltage detector is configured to detect a voltage of a common terminal of the first strain sensor and the second strain sensor, and one terminal of the first voltage detector is connected to a first preset voltage, and the other terminal of the first voltage detector is electrically connected to the common terminal of the first strain sensor and the second strain sensor.

18 Claims, 17 Drawing Sheets

(56) References Cited

U.S. PATENT DOCUMENTS

| | | | |
|---|---|---|---|
| 2013/0215056 A1 | 8/2013 | Johansson et al. | |
| 2014/0333849 A1* | 11/2014 | Ma | G02F 1/13338 349/12 |
| 2017/0090638 A1* | 3/2017 | Vosgueritchian | G06F 3/0414 |

FOREIGN PATENT DOCUMENTS

| | | |
|---|---|---|
| CN | 102216885 A | 10/2011 |
| CN | 204856438 U | 12/2015 |
| EP | 2261781 A1 | 12/2010 |

* cited by examiner

TOUCH SCREEN THAT INCLUDES A PLURALITY OF STRAIN SENSORS

CROSS REFERENCE OF RELATED APPLICATION

The present application claims the priority to Chinese Patent Application No. 201510990426.0, titled "TOUCH SCREEN", filed on Dec. 24, 2015 with the State Intellectual Property Office of the PRC, which is incorporated herein by reference in its entirety.

FIELD

The present disclosure relates to the field of touch technology, and particularly to a touch screen.

BACKGROUND

With development of electronic technology, touch screen is more and more widely used, and has been an indispensable information interaction medium for people's daily life. Touch screen provided by the conventional technology includes a touch-sensitive touch screen and a pressure-sensitive touch screen. Specifically, a piezoelectric pressure-sensitive principle is used for the pressure-sensitive touch screen. That is, the pressure-sensitive touch screen is made of a piezoelectric material. Since a resistance of the piezoelectric material will be changed in a case that pressure is applied onto the piezoelectric material, pressure applied onto the pressure-sensitive touch screen is detected by detecting a voltage of the piezoelectric material in a case of a constant current or detecting a resistance of the piezoelectric material.

However, a selection for the piezoelectric material is limited, and the pressure-sensitive touch screen made of the piezoelectric material can only sense a change in the pressure on a surface of the pressure-sensitive touch screen, and can not continuously detect the amount of the pressure on the surface of the pressure-sensitive touch screen. Therefore, an application of the pressure-sensitive touch screen in the conventional technology is limited, and the development of the pressure-sensitive touch screen is limited.

SUMMARY

In order to solve the problems described above, a touch screen is provided in the embodiments of the present disclosure. That is, conventional technologies only provide a pressure-sensitive touch screen that can only detect a change in pressure on a surface of the pressure-sensitive touch screen and can not continuously detect the amount of the pressure on the surface of the pressure-sensitive touch screen. Embodiments of the present disclosure solve this problem, and extend an application range of the pressure-sensitive touch screen and promote development of the pressure-sensitive touch screen.

In order to solve the problems described above, embodiments of the present disclosure provide a following touch screen.

The touch screen includes at least one first pressure-sensitive structure. The first pressure-sensitive structure includes: a first strain sensor located in a first region, a second strain sensor located in a second region, a first power supply configured to provide a drive signal to the first strain sensor and the second strain sensor, and a first voltage detector configured to detect a voltage of a common terminal of the first strain sensor and the second strain sensor. The first region is surrounded by the second region, a distance between a boundary line between the first region and the second region and an edge of the touch screen is less than a preset value. One terminal of the first power supply is electrically connected to one terminal of the first strain sensor away from the second strain sensor, and the other terminal of the first power supply is electrically connected to one terminal of the second strain sensor away from the first strain sensor. One terminal of the first voltage detector is electrically connected to the common terminal of the first strain sensor and the second strain sensor, the other terminal of the first voltage detector is electrically connected to a first preset voltage, and the touch screen is configured to detect pressure on a surface of the touch screen based on the voltage detected by the first voltage detector. An angle between a main strain direction of the second strain sensor and a side of the touch screen is in a range from 45 degrees to 135 degrees, inclusively.

Compared with the conventional technology, the technical solution described above has advantages as follows.

The touch screen according to the embodiments of the present disclosure includes the first strain sensor located in the first region, the second strain sensor located in the second region, the first power supply and the first voltage detector. Specifically, the first region is surrounded by the second region, the first power supply is configured to provide an operating voltage to the first strain sensor and the second strain sensor. The first voltage detector is configured to detect a voltage of the common terminal of the first strain sensor and the second strain sensor, one terminal of the first voltage detector is connected to the first preset voltage, and the other terminal of the first voltage detector is electrically connected to the common terminal of the first strain sensor and the second strain sensor. In a case that pressure is applied onto the surface of the touch screen, compressive deformation is formed in a region close to a location of the touch screen under the pressure since the region close to the location is sunk downwardly, and stretching deformation is formed in a region away from the location of the touch screen wider the pressure since the region away from the location is raised upwardly. Therefore, in a case that the pressure is applied onto the surface of the touch screen according to the embodiments of the present disclosure, the compressive deformation is detected by the first strain sensor located in the first region and the stretching deformation is detected by the second strain sensor located in the second region, and the voltage of the common terminal of the first strain sensor and the second strain sensor is detected by the first voltage detector, to obtain the amount of the pressure applied onto the surface of the touch screen.

It can be seen that the touch screen according to the embodiments of the present disclosure can not only detect a change in the pressure on the surface of the touch screen, but also continuously detect the amount of the pressure on the surface of the touch screen. In this way, the problems in the conventional technology are solved that the pressure-sensitive touch screen can only detect a change in the pressure on the surface of the pressure-sensitive touch screen and can not continuously detect the amount of the pressure on the surface of the pressure-sensitive touch screen. Accordingly, an application range of the pressure-sensitive touch screen is extended and the development of the pressure-sensitive touch screen is promoted by the solutions provided in the present disclosure.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained based on these drawings without any creative work.

DETAILED DESCRIPTION OF THE EMBODIMENTS

Figure 1:
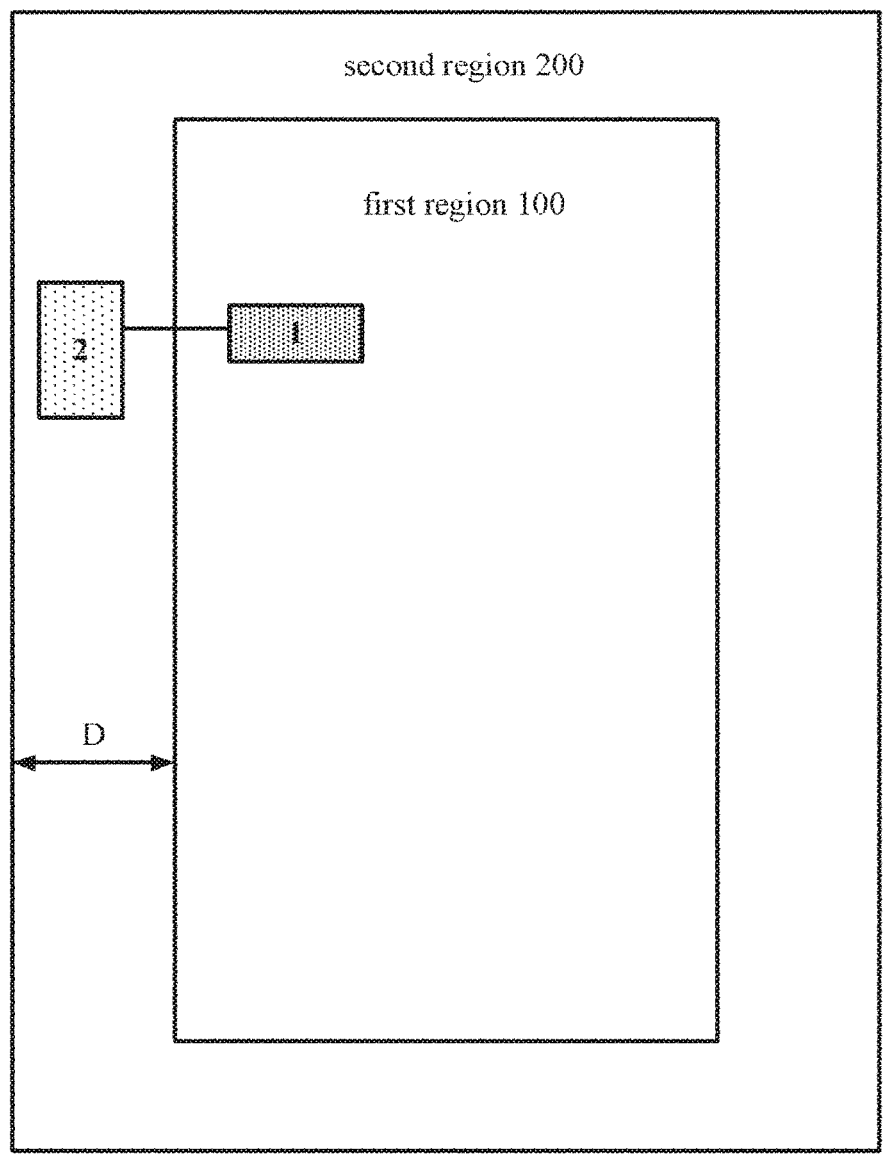
FIG. 1 is a plan view of a structure of a touch screen according to an embodiment of the present disclosure.

As described in the background part, the pressure-sensitive touch screen in the conventional technology can only sense a change in the pressure on the surface of the pressure-sensitive touch screen, and can not continuously detect the amount of the pressure on the surface of the pressure-sensitive touch screen. Therefore, the application of the pressure-sensitive touch screen in the conventional technology is limited, and the development of the pressure-sensitive touch screen is limited.

In view of this, a touch screen is provided according to the embodiments of the present disclosure. The touch screen includes at least one first pressure-sensitive structure. The first pressure-sensitive structure includes a first strain sensor located in a first region, a second strain sensor located in a second region, a first power supply configured to provide a drive signal to the first strain sensor and the second strain sensor, and a first voltage detector configured to detect a voltage of a common terminal of the first strain sensor and the second strain sensor. The first region is surrounded by the second region, a distance between a boundary line between the first region and the second region and an edge of the touch screen is less than a preset value. One terminal of the first power supply is electrically connected to one terminal of the first strain sensor away from the second strain sensor, and the other terminal of the first power supply is electrically connected to one terminal of the second strain sensor away from the first strain sensor. One terminal of the first voltage detector is electrically connected to the common terminal of the first strain sensor and the second strain sensor, and the other terminal of the first voltage detector is electrically connected to a first preset voltage, and the touch screen is configured to detect pressure on a surface of the touch screen based on the voltage detected by the first voltage detector. An angle between a main strain direction of the second strain sensor and left and right sides of the touch screen is in a range from 45 degrees to 135 degrees, inclusively.

In a case that pressure is applied onto the surface of the touch screen, compressive deformation is formed in a region close to a location of the touch screen under the pressure since the region close to the location is sunk downwardly, and stretching deformation is formed in a region away from the location of the touch screen under the pressure since the region away from the location is raised upwardly. Therefore, in a case that the pressure is applied onto the surface of the touch screen according to the embodiments of the present disclosure, the compressive deformation is detected by the first strain sensor located in the first region and the stretching deformation is detected by the second strain sensor located in the second region, and the voltage of the common terminal of the first strain sensor and the second strain sensor is detected by the first voltage detector, to obtain the amount of the pressure applied onto the surface of the touch screen. It can be seen that the touch screen according to the embodiments of the present disclosure can not only detect a change in the pressure on the surface of the touch screen, but also continuously detect the amount of the pressure on the surface of the touch screen. In this way, the problems in the conventional technology are solved that the pressure-sensitive touch screen can only detect a change in the pressure on the surface of the pressure-sensitive touch screen and can not continuously detect the amount of the pressure on the surface of the pressure-sensitive touch screen, and an application range of the pressure-sensitive touch screen is extended and the development of the pressure-sensitive touch screen is promoted.

The technical solution according to the embodiments of the present disclosure are described clearly and completely in conjunction with the drawings hereinafter. It is apparent that the described embodiments are only a few rather than all of the embodiments according to the present disclosure. Any other embodiments obtained by those skilled in the art based on the embodiments in the present disclosure without any creative work fall into the protection scope of the present disclosure.

Specific details are described in the following description so that the present disclosure can be understood completely. However, the present disclosure may also be embodied in other ways, a similar extension can be made by those skilled in the art without departing from intension of the present disclosure. Therefore, the present disclosure is not limited to the specific embodiments described below.

Figure 2:
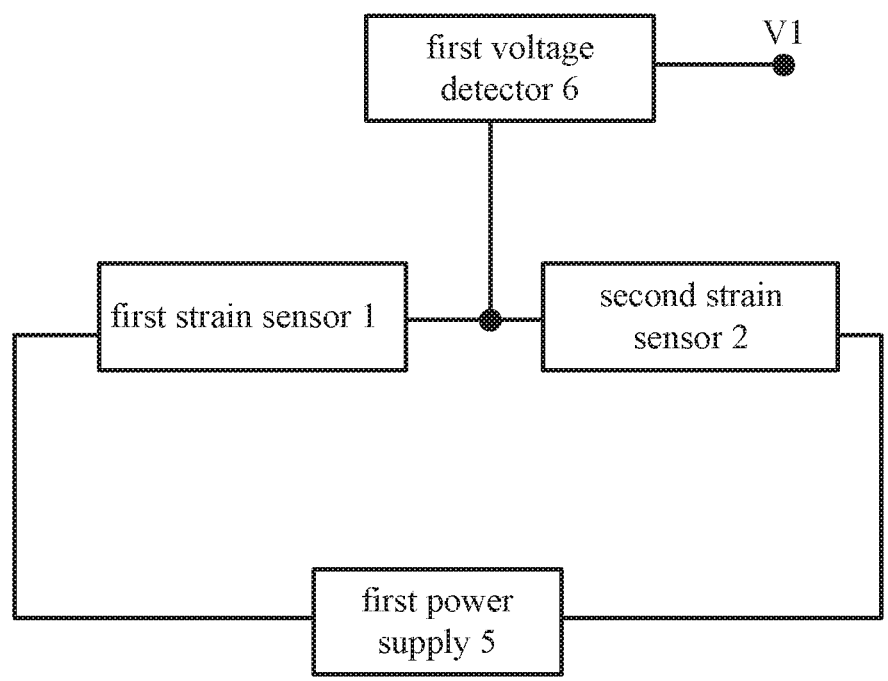
FIG. 2 is a circuit diagram of a first pressure-sensitive structure in a touch screen according to an embodiment of the present disclosure.

A touch screen is provided according to an embodiment of the present disclosure. As shown in FIG. 1 and FIG. 2, the touch screen includes at least one first pressure-sensitive structure, the first pressure-sensitive structure includes a first strain sensor 1 located in a first region 100. The first pressure-sensitive structure, in this embodiment, also includes a second strain sensor 2 located in a second region 200. The first region 100 is surrounded by the second region 200, and a distance between a boundary line between the first region 100 and the second region 200 and an edge of the touch screen is less than a preset value D. The first pressure-sensitive structure, in this embodiment, still includes a first power supply 5 configured to provide a drive signal to the first strain sensor 1 and the second strain sensor 2. One terminal of the first power supply 5 is electrically connected to one terminal of the first strain sensor 1 away from the second strain sensor 2, and the other terminal of the first power supply 5 is electrically connected to one terminal of the second strain sensor 2 away from the first strain sensor 1. The first pressure-sensitive structure, in this embodiment, yet includes a first voltage detector 6 configured to detect a voltage of a common terminal of the first strain sensor 1 and the second strain sensor 2. As shown, one terminal of the first voltage detector 6 is electrically connected to the common terminal of the first strain sensor 1 and the second strain sensor 2, and the other terminal of the first voltage detector 6 is electrically connected to a first preset voltage V1.

In the embodiment of the present disclosure, the touch screen is configured to detect pressure applied onto a surface of the touch screen based on the voltage detected by the first voltage detector 6. The greater the difference between the voltage detected by the first voltage detector 6 and the first preset voltage V1, the greater the pressure applied onto the surface of the touch screen. And the less the difference between the voltage detected by the first voltage detector 6 and the first preset voltage V1, the less the pressure applied onto the surface of the touch screen. And no pressure is applied onto the surface of the touch screen in a case that the voltage detected by the first voltage detector 6 is equal to the first preset voltage V1.

Figure 3:
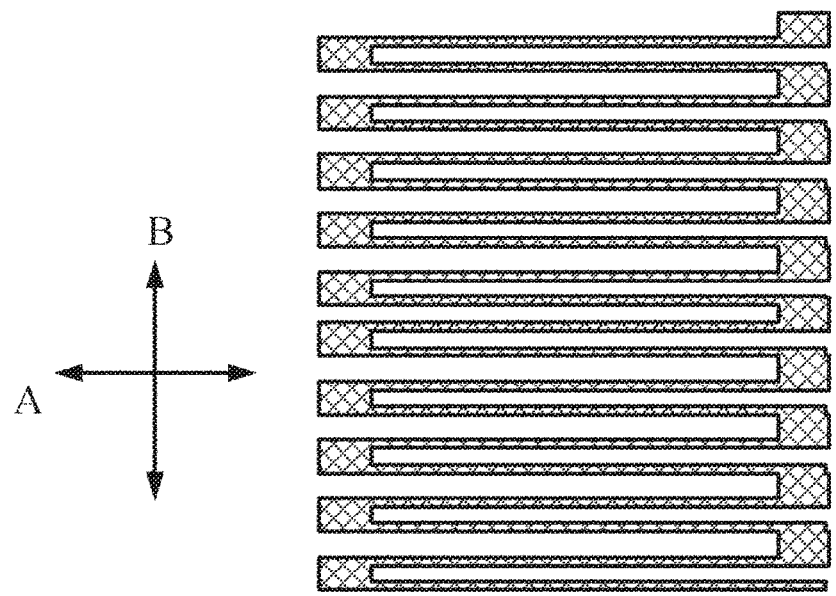
FIG. 3 is a plan view of a strain sensor according to an embodiment of the present disclosure.
Figure 4:
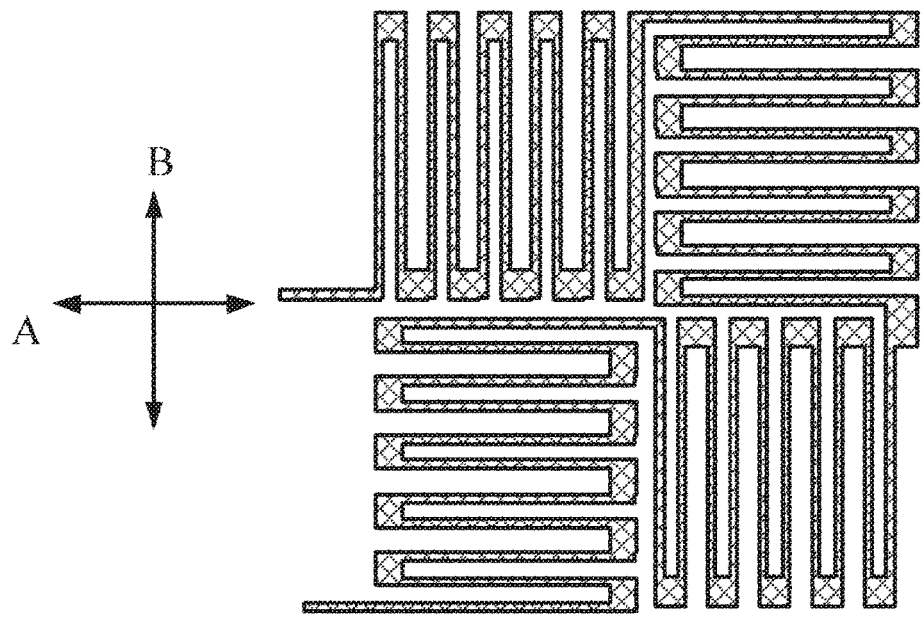
FIG. 4 is a plan view of a strain sensor according to another embodiment of the present disclosure.
Figure 5:
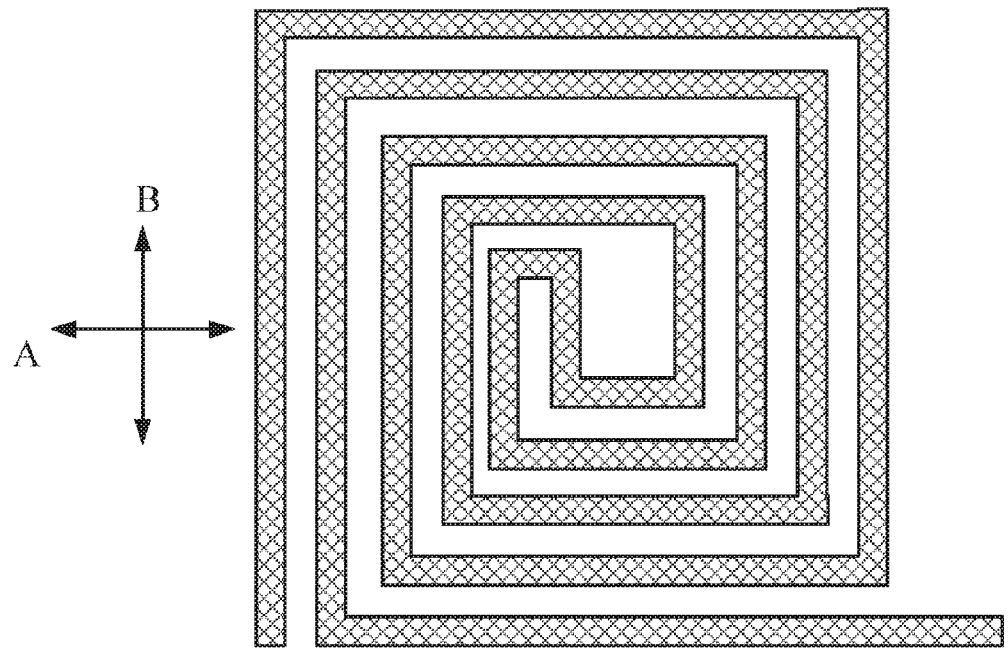
FIG. 5 is a plan view of a strain sensor according to yet another embodiment of the present disclosure.

It should be illustrated that, in the embodiment of the present disclosure, each of the first strain sensor 1 and the second strain sensor 2 includes two strain directions, i.e. a main strain direction and an auxiliary strain direction. Specifically, detection sensitivity in the main strain direction A is greater than detection sensitivity in the auxiliary strain direction B, as shown in FIG. 3. Alternatively, the detection sensitivity in the main strain direction A is equal to the detection sensitivity in the auxiliary strain direction B, as shown in FIG. 4 and FIG. 5.

Based on the embodiment described above, in an embodiment of the present disclosure, since stretching deformation in different directions of the second region 200 is different, in order to improve detection sensitivity of the first pressure-sensitive structure, the detection sensitivity in the main strain direction of the second strain sensor 2 is greater than the detection sensitivity in the auxiliary strain direction of the second strain sensor 2. And an angle between the main strain direction of the second strain sensor 2 and a side of the touch screen is in a range from 45 degrees to 135 degrees, inclusively. Optionally, an angle between the main strain direction of the second strain sensor 2 and a first side of the touch screen is equal to 90 degrees. Specifically, an extension direction of the first side is perpendicular to a direction from a region where the first strain sensor 1 is located to a region where the second strain sensor 2 is located. In other embodiments of the present disclosure, the angle between the main strain direction of the second strain sensor 2 and the side of the touch screen may be equal to other degree. It thus should be understood the angle between the main strain direction of the second strain sensor 2 and the side of the touch screen is not intended to be limited.

The compressive deformation in different directions of the first region 100 is substantially the same. In an optional embodiment of the present disclosure, detection sensitivity in a main strain direction of the first strain sensor 1 is equal to detection sensitivity in an auxiliary strain direction of the first strain sensor 1. And the main strain direction of the first strain sensor 1 may be perpendicular to the main strain direction of the second strain sensor 2, or may be parallel to the main strain direction of the second strain sensor 2, or may form any angle with the main strain direction of the second strain sensor 2, which is not limited in the present disclosure, as the case may be.

Based on any one of the embodiments described above, in an embodiment of the present disclosure, optionally, the first preset voltage V1 may be equal to zero, the voltage detected by the first voltage detector 6 corresponds to the pressure applied onto the surface of the touch screen. That is, the greater the voltage detected by the first voltage detector 6, the greater the pressure applied onto the surface of the touch screen, the less the voltage detected by the first voltage detector 6, the less the pressure applied onto the surface of the touch screen, no pressure is applied onto the surface of the touch screen in a case that the voltage detected by the first voltage detector 6 is equal to zero, which is not limited in the present disclosure, as the case may be.

Figure 6:
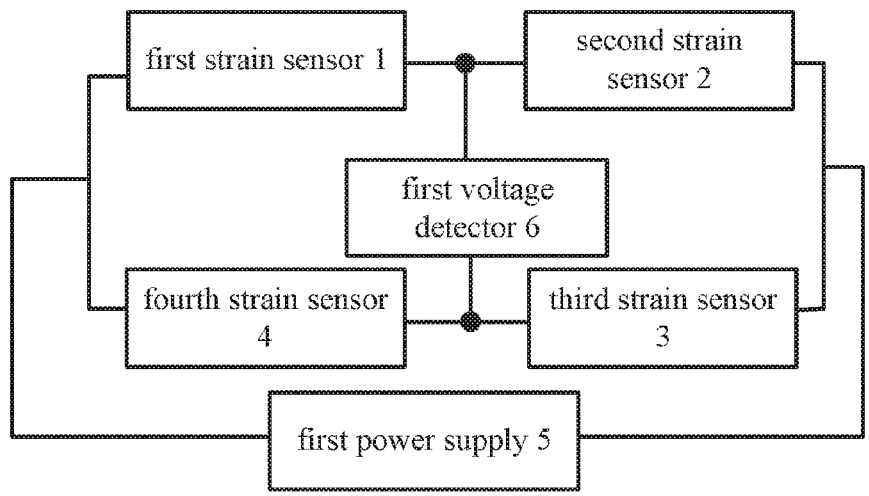
FIG. 6 is a circuit diagram of a first pressure-sensitive structure in a touch screen according to another embodiment of the present disclosure.
Figure 7:
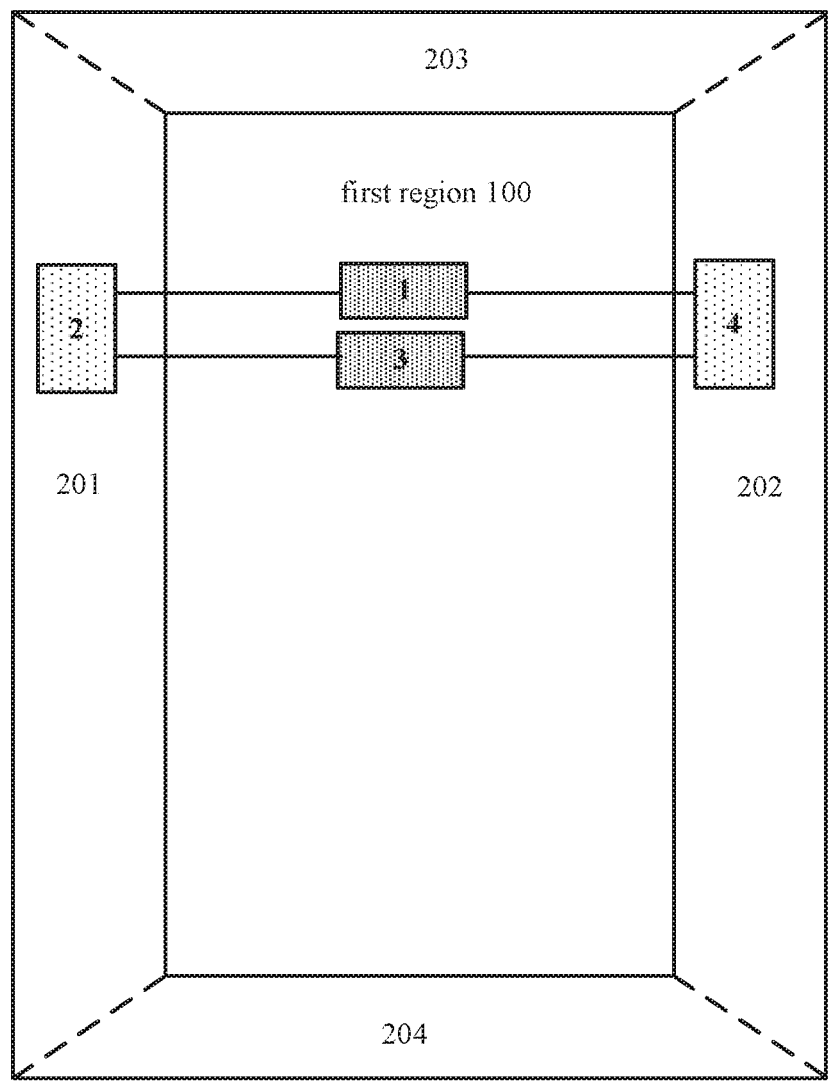
FIG. 7 is a plan view of a structure of a touch screen according to another embodiment of the present disclosure.

FIG. 6 and FIG. 7 are structural diagrams of another embodiment of the present disclosure. Based on any one of the embodiments described above and in conjunction with FIG. 6 and FIG. 7, the first pressure-sensitive structure further includes a third strain sensor 3 located in the first region 100. The third strain sensor 3 is electrically connected to one terminal of the second strain sensor 2 away from the first strain sensor 1. The first pressure-sensitive structure further includes a fourth strain sensor 4 located in the second region 200. One terminal of the fourth strain sensor 4 is electrically connected to one terminal of the third strain sensor 3 away from the second strain sensor 2, and the other terminal of the fourth strain sensor 4 is electrically connected to one terminal of the first strain sensor 1 away from the second strain sensor 2. Optionally, detection sensitivity in a main strain direction of the fourth strain sensor 4 is greater than detection sensitivity in an auxiliary strain direction of the fourth strain sensor 4. More optionally, an angle between the main strain direction of the fourth strain sensor 4 and a side of the touch screen is in a range from 45 degrees to 135 degrees, inclusively.

In this embodiment of the present disclosure, the first preset voltage V1 is a voltage of a common terminal of the third strain sensor 3 and the fourth strain sensor 4. The first voltage detector 6 is configured to detect a voltage difference between the voltage of the common terminal of the first strain sensor 1 and the second strain sensor 2 and the voltage of the common terminal of the third strain sensor 3 and the fourth strain sensor 4. In the embodiment, the touch screen is configured to detect pressure applied onto the surface of the touch screen based on a voltage (that is, the voltage difference between the voltage of the common terminal of the first strain sensor 1 and the second strain sensor 2 and the voltage of the common terminal of the third strain sensor 3 and the fourth strain sensor 4) detected by the first voltage detector 6. Specifically, the greater the voltage difference between the voltage of the common terminal of the first strain sensor 1 and the second strain sensor 2 and the voltage of the common terminal of the third strain sensor 3 and the fourth strain sensor 4, the greater the pressure applied onto the surface of the touch screen. The less the voltage difference between the voltage of the common terminal of the first strain sensor 1 and the second strain sensor 2 and the voltage of the common terminal of the third strain sensor 3 and the fourth strain sensor 4, the less the pressure applied onto the surface of the touch screen. No pressure is applied onto the surface of the touch screen in a case that the voltage difference between the voltage of the common terminal of the first strain sensor 1 and the second strain sensor 2 and the voltage of the common terminal of the third strain sensor 3 and the fourth strain sensor 4 is equal to zero.

It should be noted that, in the embodiment of the present disclosure, the third strain sensor 3 is located in the first region 100, the fourth strain sensor 4 is located in the second region 200. In this arrangement, compressive deformation is detected by the third strain sensor 3 and stretching deformation is detected by the fourth strain sensor 4 in a case that pressure is applied onto the surface of the touch screen. The first strain sensor 1, the second strain sensor 2, the third strain sensor 3 and the fourth strain sensor 4 form a full bridge structure, an influence of factors such as temperature of the surrounding environment on the deformation can be evaded when the first pressure-sensitive structure detects the pressure applied onto the surface of the touch screen, and detection sensitivity of the first pressure-sensitive structure is further improved.

Figure 8:
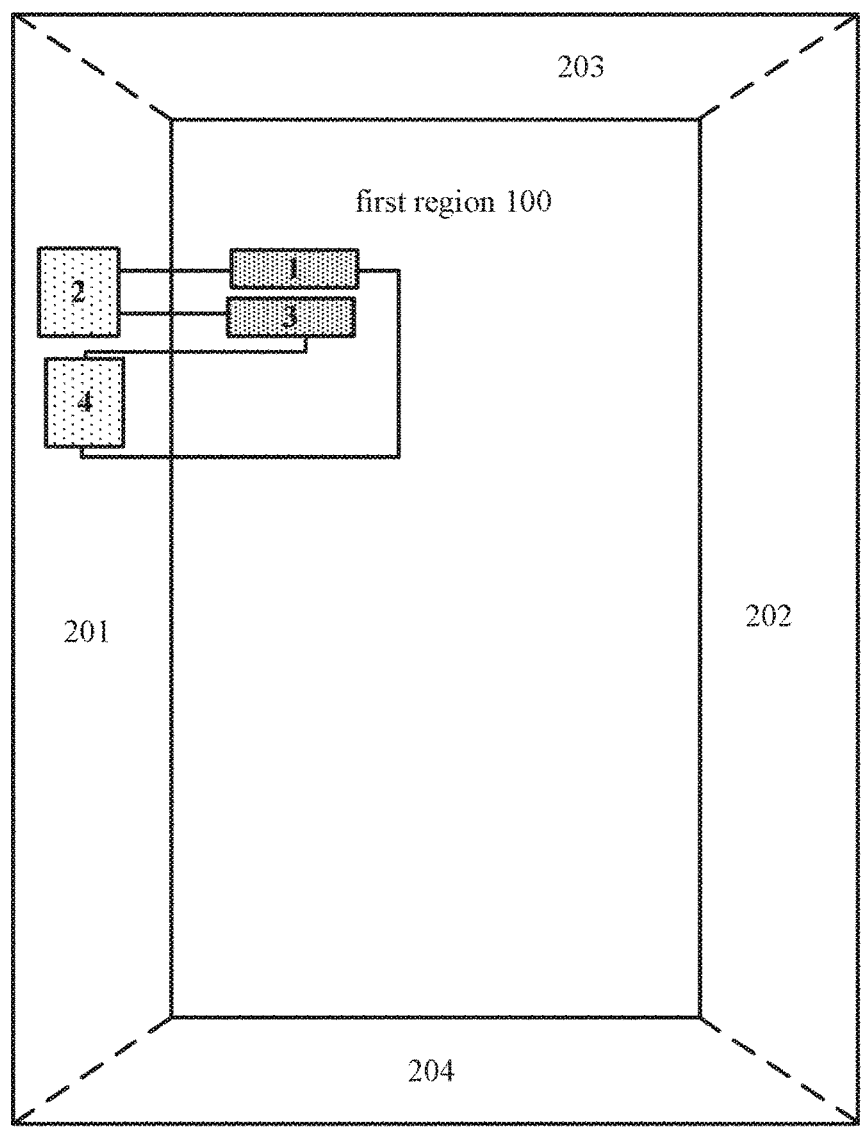
FIG. 8 is a plan view of a structure of a touch screen according to yet another embodiment of the present disclosure.
Figure 9:
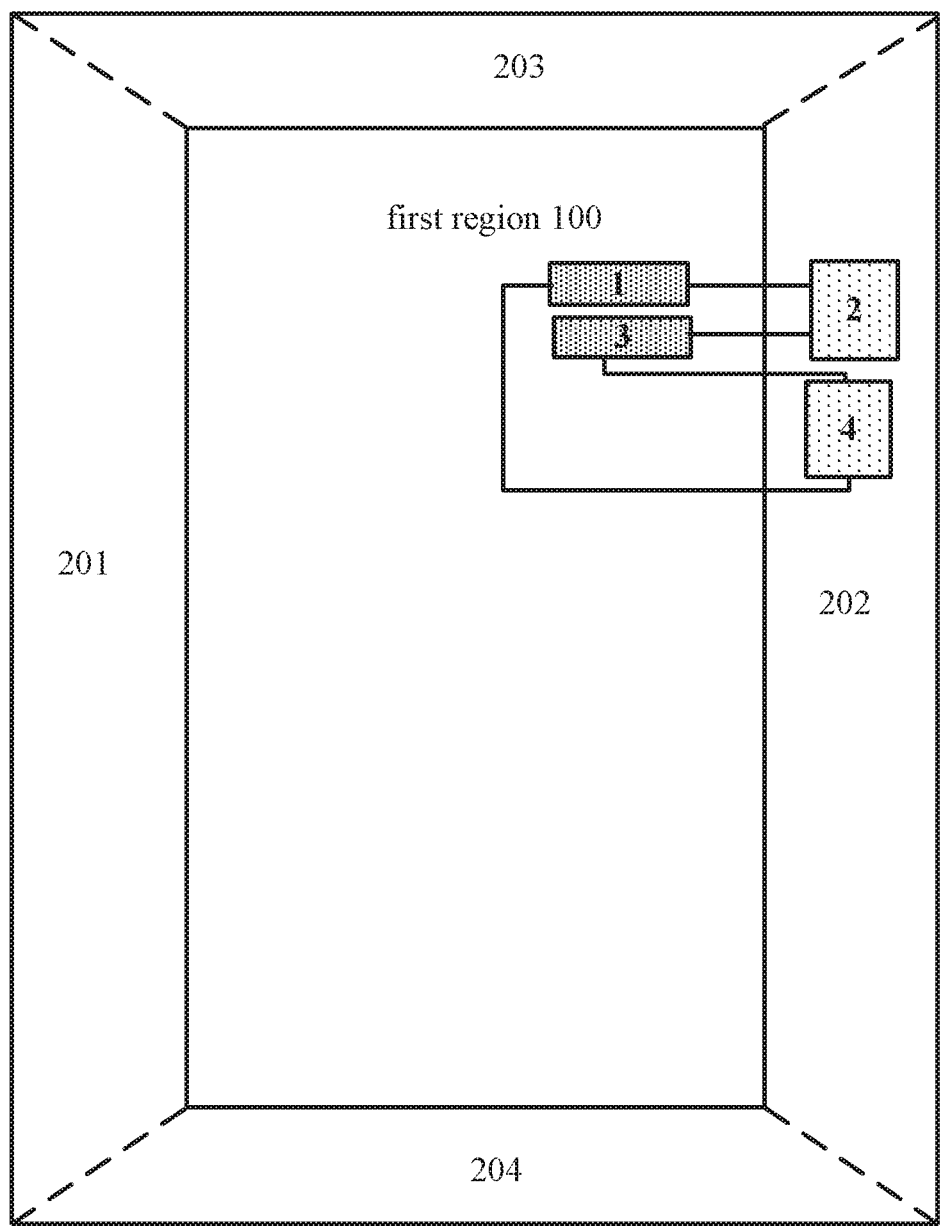
FIG. 9 is a plan view of a structure of a touch screen according to yet another embodiment of the present disclosure.

As shown in FIG. 7 to FIG. 9, the second region 200 includes a first sub-region 201 and a second sub-region 202 arranged opposite to each other in a first direction, and a third sub-region 203 and a fourth sub-region 204 arranged opposite to each other in a second direction. The first direction is perpendicular to the second direction. Based on the embodiments described above, in an embodiment of the present disclosure, the second strain sensor 2 and the fourth strain sensor 4 are located in different sub-regions. As shown in FIG. 7, the second strain sensor 2 is located in the first sub-region 201, and the fourth strain sensor 4 is located in the second sub-region 202. Alternatively, the second strain sensor 2 is located in the second sub-region 202, and the fourth strain sensor 4 is located in the first sub-region 201. In another embodiment of the present disclosure, the second strain sensor 2 and the fourth strain sensor 4 are located in the same sub-region. As shown in FIG. 8, both the second strain sensor 2 and the fourth strain sensor 4 are located in the first sub-region 201. Alternatively, as shown in FIG. 9, both the second strain sensor 2 and the fourth strain sensor 4 are located in the second sub-region 202.

Figure 10:
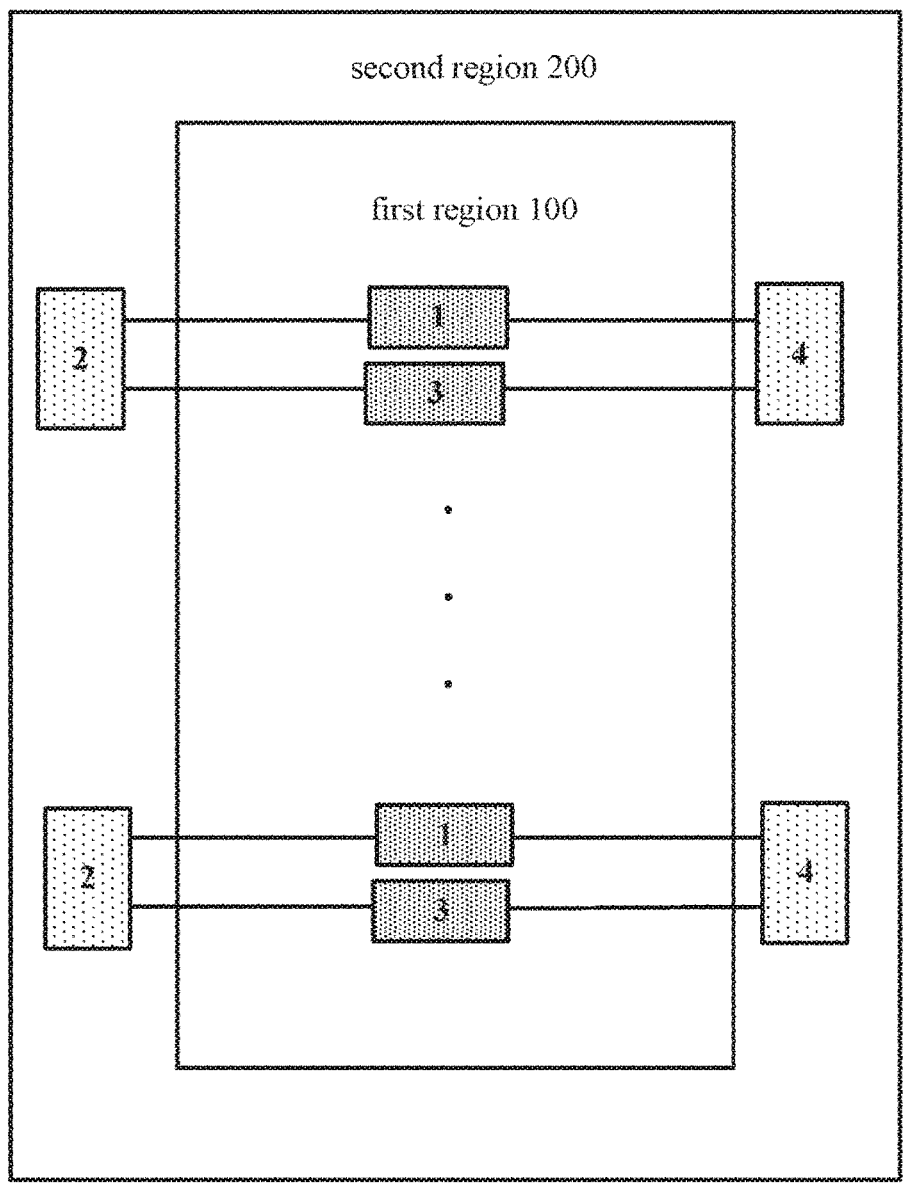
FIG. 10 is a plan view of a structure of a touch screen according to yet another embodiment of the present disclosure.
Figure 11:
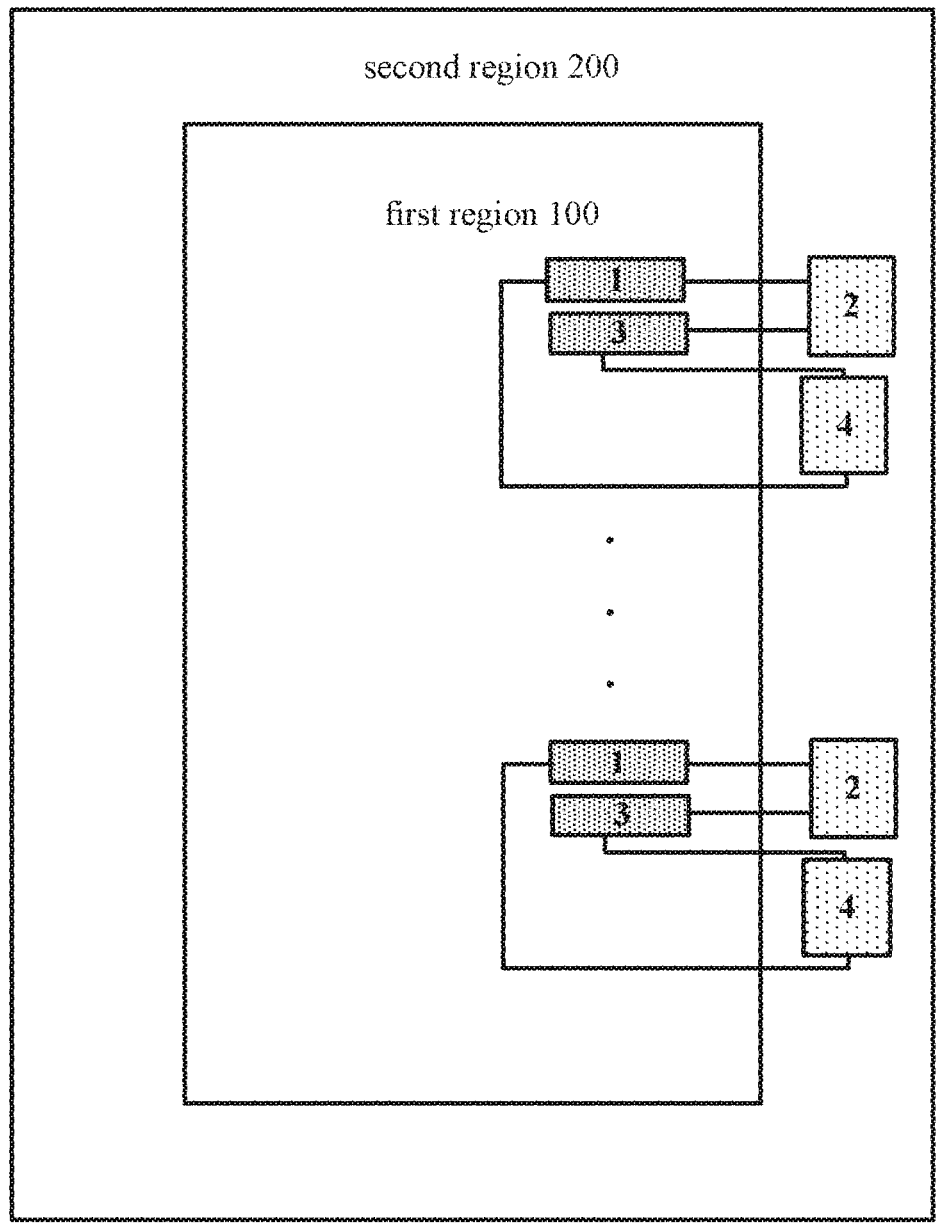
FIG. 11 is a plan view of a structure of a touch screen according to yet another embodiment of the present disclosure.
Figure 12:
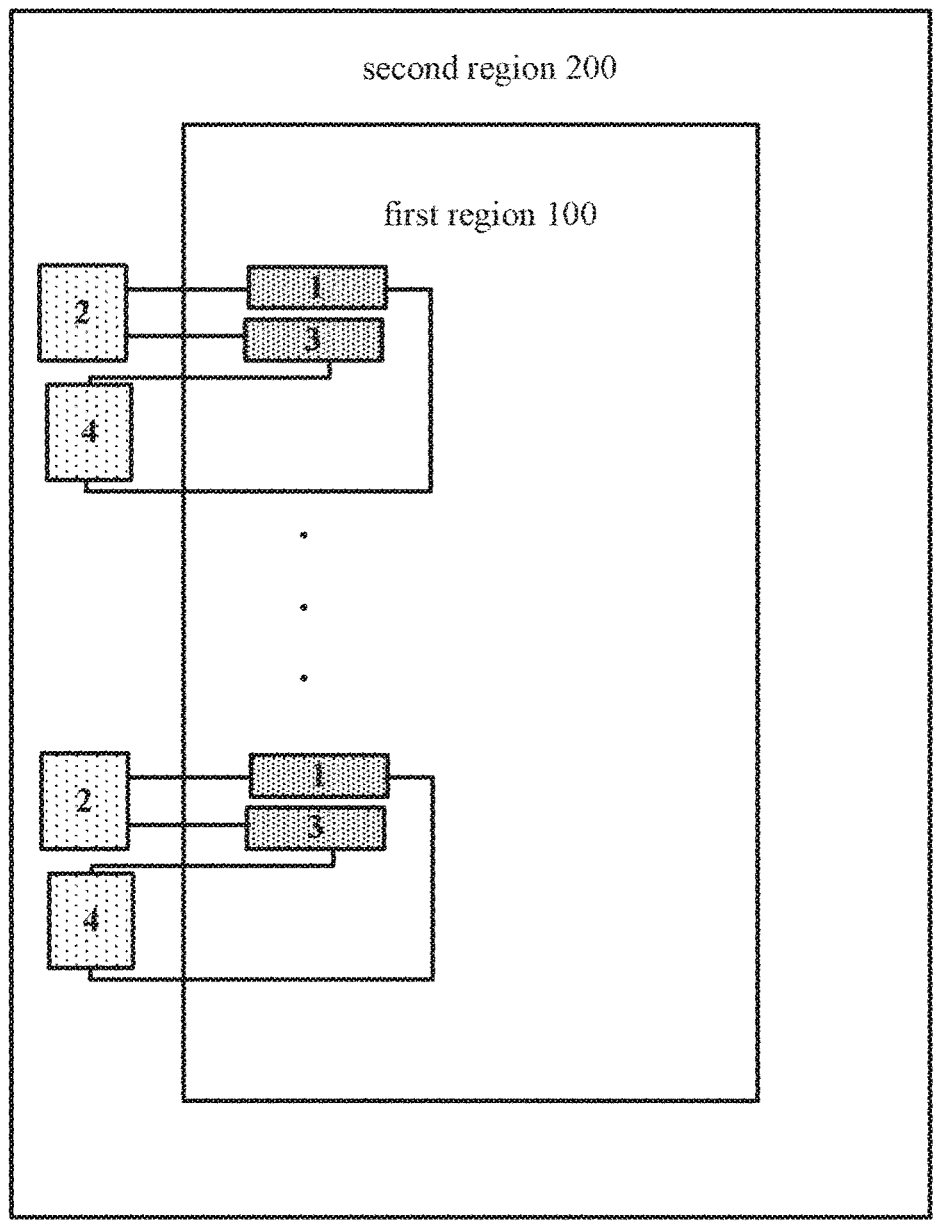
FIG. 12 is a plan view of a structure of a touch screen according to yet another embodiment of the present disclosure.

Based on any one of the embodiments described above, in an embodiment of the present disclosure, as shown in FIG. 10 to FIG. 12, the touch screen includes multiple first pressure-sensitive structures. And the multiple first pressure-sensitive structures are arranged side by side in the second direction.

Figure 13:
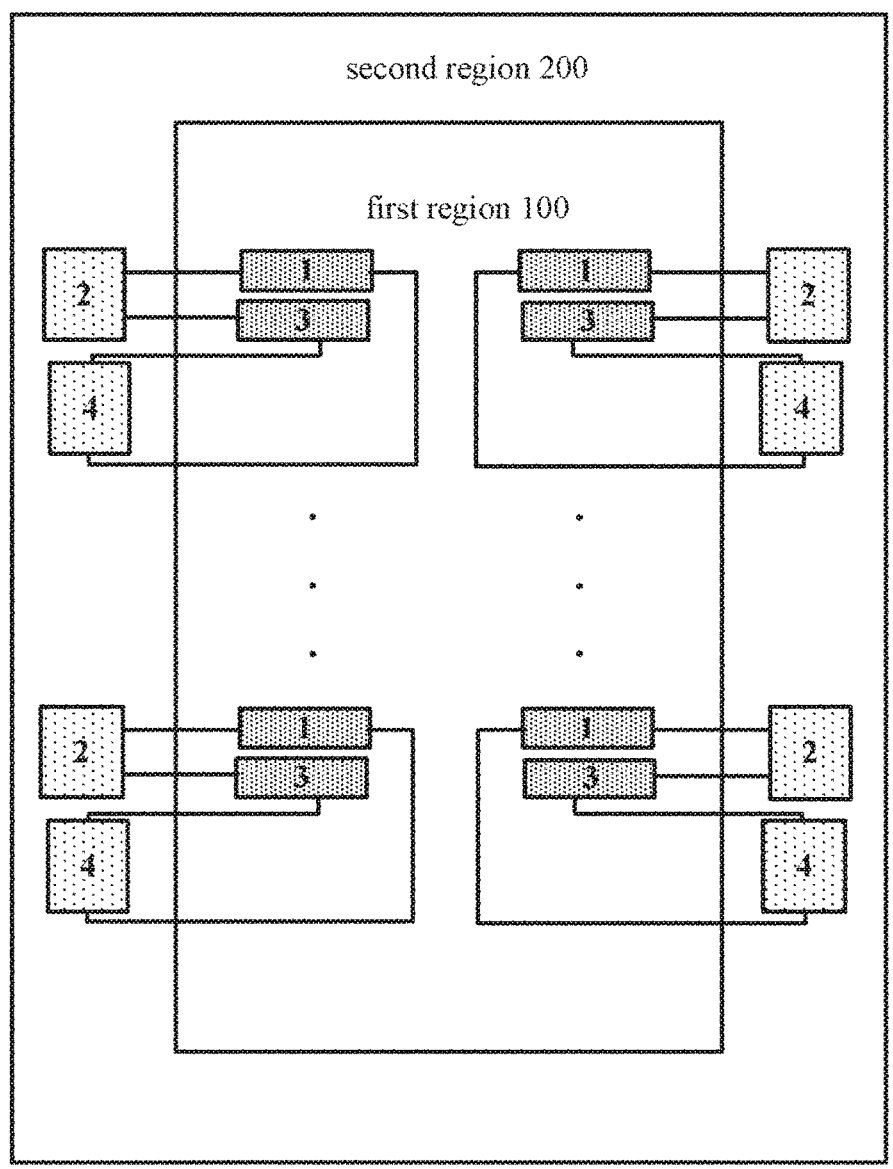
FIG. 13 is a plan view of a structure of a touch screen according to yet another embodiment of the present disclosure.

It should be noted that, in a case that the second strain sensor 2 and the fourth strain sensor 4 in the first pressure-sensitive structure are located in the same sub-region, second strain sensors 2 in a part of the multiple first pressure-sensitive structures are located in the first sub-region 201, and second strain sensors 2 in the other part of the multiple first pressure-sensitive structures are located in the second sub-region 202, as shown in FIG. 13, which is not limited in the present disclosure, as the case may be.

Based on the embodiments described above, in an embodiment of the present disclosure, in a case that the second strain sensors 2, in a part of the multiple first pressure-sensitive structures, are located in the first sub-region 201, and the second strain sensors 2, in the other part of the multiple first pressure-sensitive structures, are located in the second sub-region 202. Optionally, the number of second strain sensors 2 and the number of fourth strain sensors 4 at a side of the first region 100 are the same as the number of second strain sensors 2 and the number of fourth strain sensors 4 at the other side of the first region 100, respectively. The second strain sensors 2 at a side of the first region 100 have a one-to-one correspondence with the second strain sensors 2 at the other side of the first region 100, and the fourth strain sensors 4 at a side of the first region 100 have a one-to-one correspondence with the fourth strain sensors 4 at the other side of the first region 100, which is not limited in the present disclosure, as the case may be.

In a case that the pressure is applied onto the surface of the touch screen, stretching deformation on a short side of the touch screen is greater than stretching deformation on a long side of the touch screen. Therefore, based on any one of the embodiments, in order to improve the detection accuracy of the first pressure-sensitive structure, a distance between the first sub-region 201 and the second sub-region 202 is less than a distance between the third sub-region 203 and the fourth sub-region 204.

Figure 14:
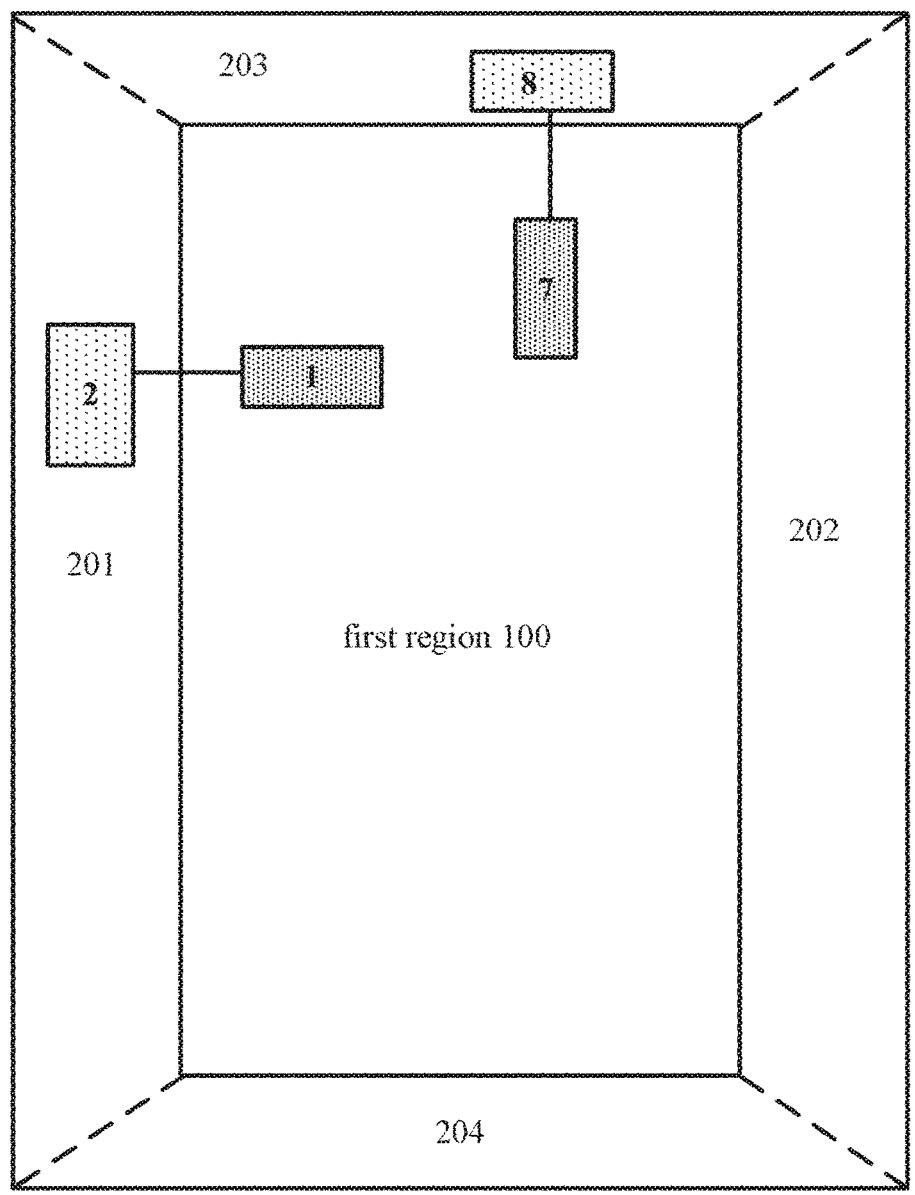
FIG. 14 is a plan view of a structure of a touch screen according to yet another embodiment of the present disclosure.
Figure 15:
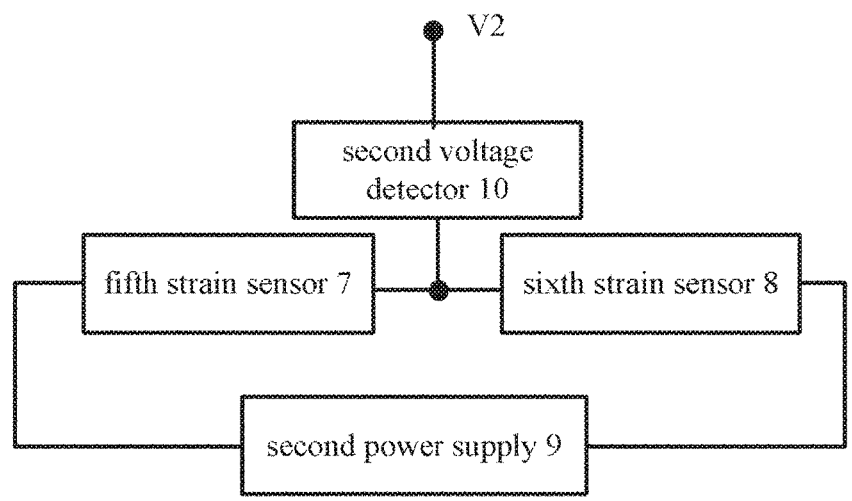
FIG. 15 is a circuit diagram of a second pressure-sensitive structure in a touch screen according to an embodiment of the present disclosure.

In order to further improve the accuracy of pressure detection in the touch screen, based on the embodiments described above, in an embodiment of the present disclosure, the touch screen further includes at least one second pressure-sensitive structure, as shown in FIG. 14 and FIG. 15. The second pressure-sensitive structure includes a fifth strain sensor 7 located in the first region 100. The second pressure-sensitive structure, in this embodiment, also includes a sixth strain sensor 8 located in the third sub-region 203 or the fourth sub-region 204. The second pressure-sensitive structure, in this embodiment, still includes a second power supply 9 configured to provide a drive signal to the fifth strain sensor 7 and the sixth strain sensor 8. One terminal of the second power supply 9 is electrically connected to one terminal of the fifth strain sensor 7 away from the sixth strain sensor 8, the other terminal of the second power supply 9 is electrically connected to one terminal of the sixth strain sensor 8 away from the fifth strain sensor 7. The second pressure-sensitive structure, in this embodiment, yet includes a second voltage detector 10 configured to detect a voltage of a common terminal of the fifth strain sensor 7 and the sixth strain sensor 8. One terminal of the second voltage detector 10 is electrically connected to the common terminal of the fifth strain sensor 7 and the sixth strain sensor 8, and the other terminal of the second voltage detector 10 is electrically connected to a second preset voltage V2. The touch screen is further configured to detect pressure on a surface of the touch screen based on the voltage detected by the second voltage detector 10.

Specifically, the greater the difference between the voltage detected by the second voltage detector 10 and the second preset voltage V2, the greater the pressure applied onto the surface of the touch screen. The less the difference between the voltage detected by the second voltage detector 10 and the second preset voltage V2, the less the pressure applied onto the surface of the touch screen. No pressure is applied onto the surface of the touch screen in a case that the voltage detected by the second voltage detector 10 is equal to the second preset voltage V2.

Based on the embodiments described above, in an embodiment of the present disclosure, since stretching deformation in different directions of the second region 200 is different, in order to improve detection sensitivity of the second pressure-sensitive structure, detection sensitivity in a main strain direction of the sixth strain sensor 8 is greater than detection sensitivity in an auxiliary strain direction of the sixth strain sensor 8. And an angle between the main strain direction of the sixth strain sensor 8 and a side of the touch screen is in a range from 45 degrees to 135 degrees, inclusively. Optionally, an angle between the main strain direction of the sixth strain sensor 8 and a side of the third sub-region 203 away from the first region 100 is equal to 90 degrees. In other embodiment of the present disclosure, the angle between the main strain direction of the sixth strain sensor 8 and the side of the touch screen may be equal to other degree, which is not limited in the present disclosure, as the case may be.

The compressive deformation in different directions of the first region 100 is substantially the same. In an optional embodiment of the present disclosure, detection sensitivity in a main strain direction of the fifth strain sensor 7 may be equal to detection sensitivity in an auxiliary strain direction of the fifth strain sensor 7. And the main strain direction of the fifth strain sensor 7 may be perpendicular to the main strain direction of the sixth strain sensor 8, or may be parallel to the main strain direction of the sixth strain sensor 8, or may form any angle with the main strain direction of the sixth strain sensor 8, which is not intended to be limited.

Based on any one of the embodiments described above, in an embodiment of the present disclosure, optionally, the second preset voltage V2 may be equal to zero, the voltage detected by the second voltage detector 10 corresponds to pressure applied onto the surface of the touch screen. That is, the greater the voltage detected by the second voltage detector 10, the greater the pressure applied onto the surface of the touch screen, the less the voltage detected by the second voltage detector 10, the less the pressure applied onto the surface of the touch screen, no pressure is applied onto the surface of the touch screen in a case that the voltage detected by the second voltage detector 10 is equal to zero, which is not limited in the present disclosure, as the case may be.

Figure 16:
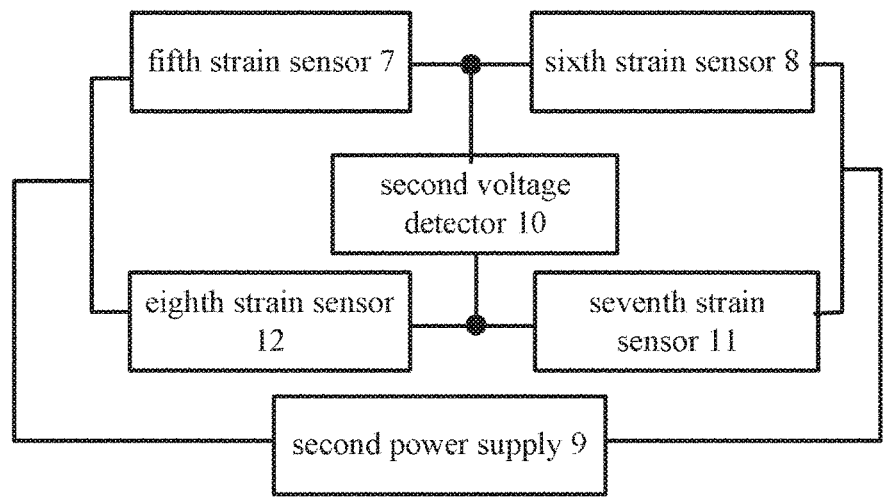
FIG. 16 is a circuit diagram of a second pressure-sensitive structure in a touch screen according to another embodiment of the present disclosure.
Figure 17:
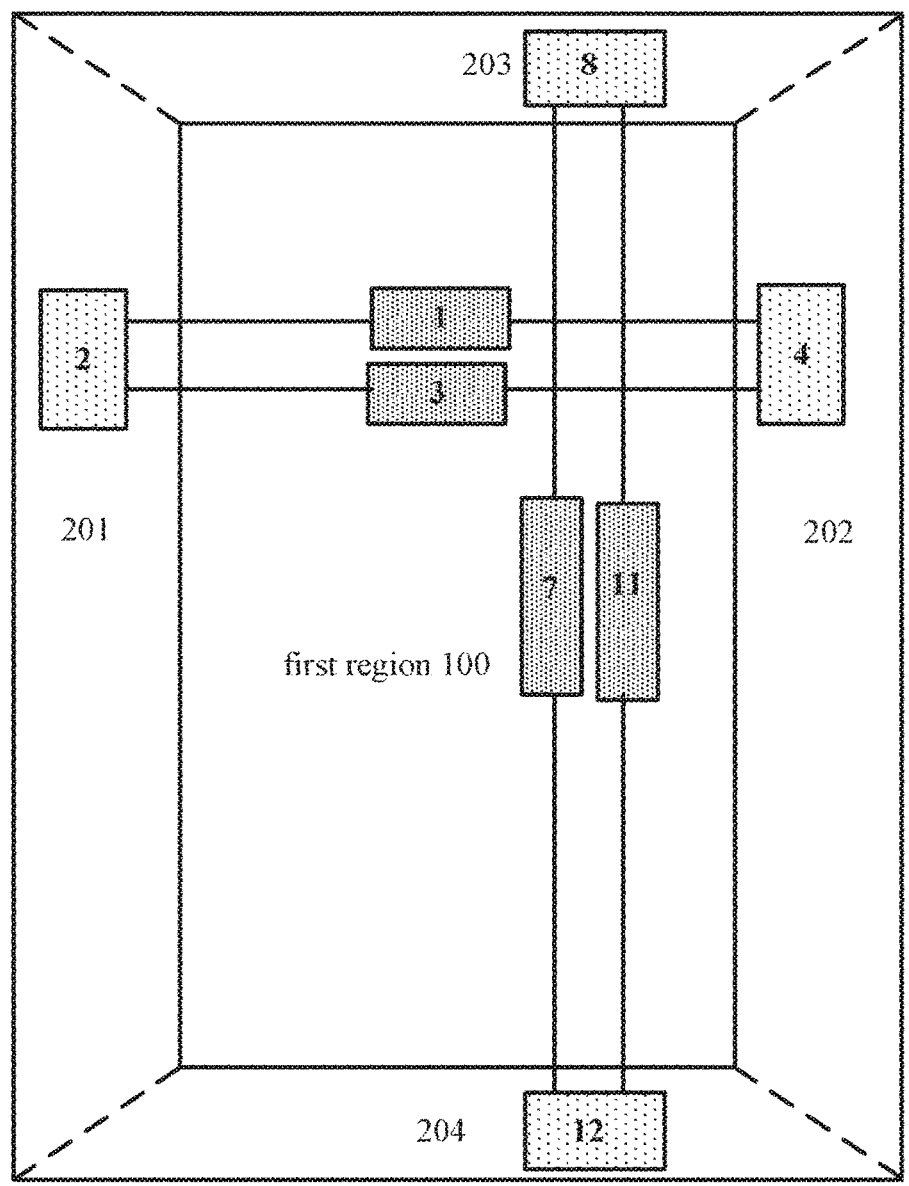
FIG. 17 is a plan view of a structure of a touch screen according to yet another embodiment of the present disclosure.

Based on any one of the embodiments described above, in an embodiment of the present disclosure, as shown in FIG. 16 and FIG. 17, the second pressure-sensitive structure further includes a seventh strain sensor 11 located in the first region 100. The seventh strain sensor 11 is electrically connected to one terminal of the sixth strain sensor 8 away from the fifth strain sensor 7. The second pressure-sensitive structure, in this embodiment, further includes an eighth strain sensor 12 located in the third sub-region 203 or the fourth sub-region 204. One terminal of the eighth strain sensor 12 is electrically connected to one terminal of the seventh strain sensor 11 away from the sixth strain sensor 8, the other terminal of the eighth strain sensor 12 is electrically connected to one terminal of the fifth strain sensor 7 away from the sixth strain sensor 8. In some embodiments, detection sensitivity in a main strain direction of the eighth strain sensor 12 is greater than detection sensitivity in an auxiliary strain direction of the eighth strain sensor 12. In some embodiments, an angle between the main strain direction of the eighth strain sensor 12 and a side of the touch screen is in a range from 45 degrees to 135 degrees, inclusively.

In the embodiment, the second preset voltage V2 is a voltage of a common terminal of the seventh strain sensor 11 and the eighth strain sensor 12, the second voltage detector 10 is configured to detect a voltage difference between the voltage of the common terminal of the fifth strain sensor 7 and the sixth strain sensor 8 and the voltage of the common terminal of the seventh strain sensor 11 and the eighth strain sensor 12. Specifically, the greater the voltage difference between the voltage of the common terminal of the fifth strain sensor 7 and the sixth strain sensor 8 and the voltage of the common terminal of the seventh strain sensor 11 and the eighth strain sensor 12, the greater the pressure applied onto the surface of the touch screen. The less the voltage difference between the voltage of the common terminal of the fifth strain sensor 7 and the sixth strain sensor 8 and the voltage of the common terminal of the seventh strain sensor 11 and the eighth strain sensor 12, the less the pressure applied onto the surface of the touch screen. No pressure is applied onto the surface of the touch screen in a case that the voltage difference between the voltage of the common terminal of the fifth strain sensor 7 and the sixth strain sensor 8 and the voltage of the common terminal of the seventh strain sensor 11 and the eighth strain sensor 12 is equal to zero.

It should be noted that, in the embodiment of the present disclosure, the seventh strain sensor 11 is located in the first region 100, the eighth strain sensor 12 is located in the second region 200, therefore, compressive deformation is detected by the seventh strain sensor 11 and stretching deformation is detected by the eighth strain sensor 12 in a case that pressure is applied onto the surface of the touch screen. The fifth strain sensor 7, the sixth strain sensor 8, the seventh strain sensor 11 and the eighth strain sensor 12 form a full bridge structure, an influence of factors such as temperature of the surrounding environment on the deformation can be evaded when the second pressure-sensitive structure detects the pressure applied onto the surface of the touch screen, and detection sensitivity of the second pressure-sensitive structure is further improved.

Figure 18:
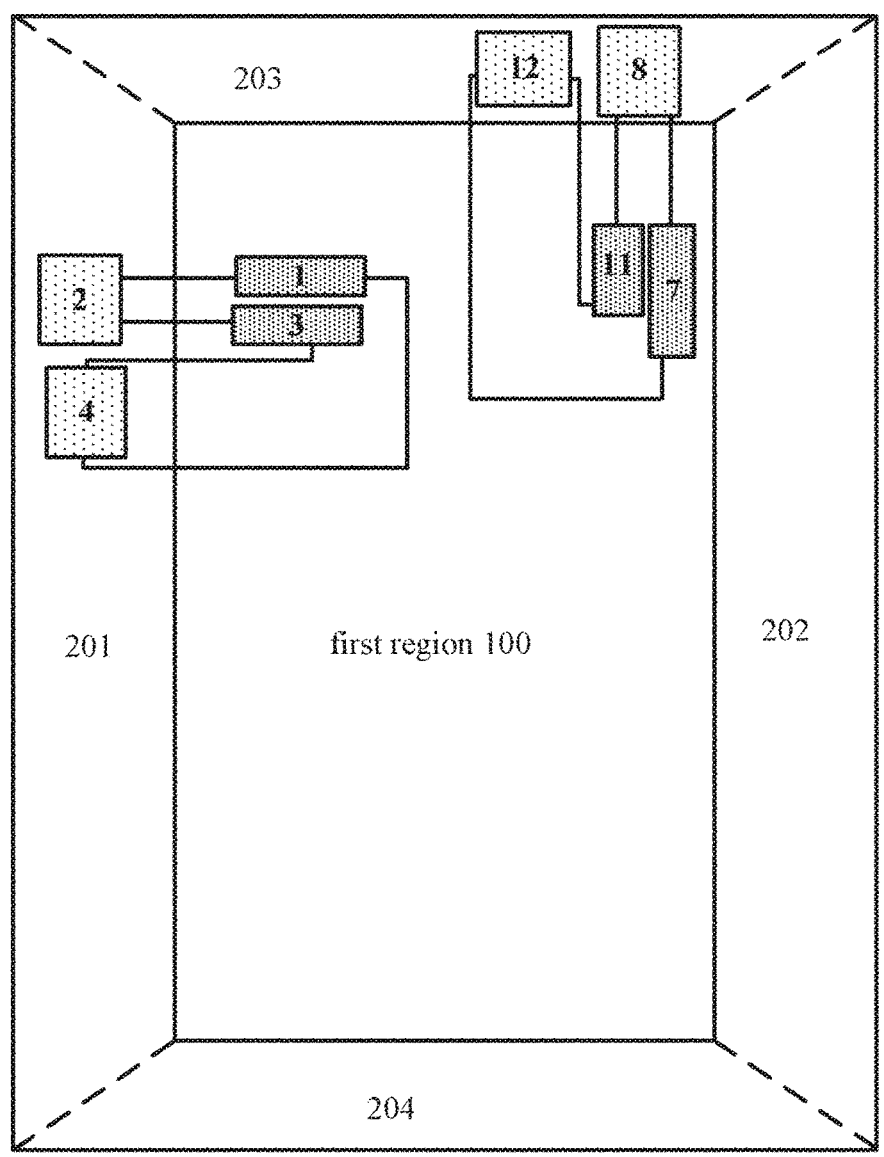
FIG. 18 is a plan view of a structure of a touch screen according to yet another embodiment of the present disclosure.
Figure 19:
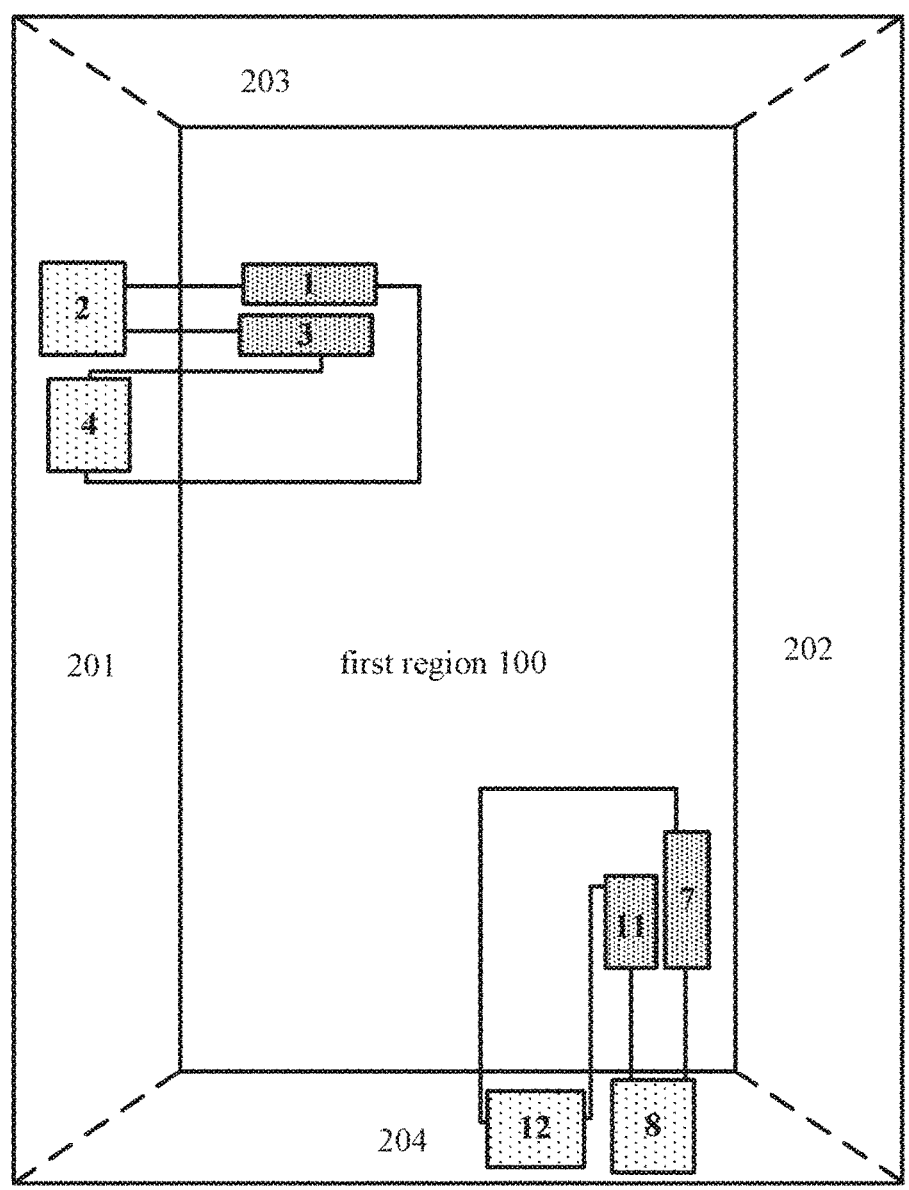
FIG. 19 is a plan view of a structure of a touch screen according to yet another embodiment of the present disclosure.

Based on any one of the embodiments described above, in an embodiment of the present disclosure, as shown in FIG. 17, the sixth strain sensor 8 and the eighth strain sensor 12 are located in different sub-regions, the sixth strain sensor 8 is located in the third sub-region 203, and the eighth strain sensor 12 is located in the fourth sub-region 204. Alternatively, the sixth strain sensor 8 is located in the fourth sub-region 204, and the eighth strain sensor 12 is located in the third sub-region 203. In another embodiment of the present disclosure, the sixth strain sensor 8 and the eighth strain sensor 12 are located in the same sub-region. As shown in FIG. 18, both the sixth strain sensor 8 and the eighth strain sensor 12 are located in the third sub-region 203. Alternatively as shown in FIG. 19, both the sixth strain sensor 8 and the eighth strain sensor 12 are located in the fourth sub-region 204, which is not limited in the present disclosure, as the case may be.

Based on any one of the embodiments described above, in an embodiment of the present disclosure, the touch screen includes multiple second pressure-sensitive structures. The multiple second pressure-sensitive structures are arranged side by side in the first direction. It should be noted that in a case that the sixth strain sensor 8 and the eighth strain sensor 12 in the second pressure-sensitive structure are located in the same sub-region, sixth strain sensors 8 in all of the multiple second pressure-sensitive structures may be located in the third sub-region 203, or may be located in the fourth sub-regions 204. Alternatively, sixth strain sensors 8 in a part of the multiple second pressure-sensitive structures are located in the three sub-region 203, and sixth strain sensors 8 in the other part of the multiple second pressure-sensitive structures are located in the fourth sub-region 204, which is not limited in the present disclosure, as the case may be.

Based on any one of the embodiments described above, in an embodiment of the present disclosure, in a case that the sixth strain sensors 8 in a part of the multiple second pressure-sensitive structures are located in the third sub-region 203, and the sixth strain sensors 8 in the other part of the multiple second pressure-sensitive structures are located in the fourth sub-region 204, optionally, the number of sixth strain sensors 8 at a side of the first region 100 is the same as the number of sixth strain sensors 8 at the other side of the first region 100, and the sixth strain sensors 8 at a side of the first region have a one-to-one correspondence with the sixth strain sensors 8 at the other side of the first region, and eighth strain sensors 12 at a side of the first region 100 have a one-to-one correspondence with eighth strain sensors 12 at the other side of the first region 100, which is not limited in the present disclosure, as the case may be.

Based on any one of the embodiments described above, in an optional embodiment of the present disclosure, the preset value D is equal to 10 mm. That is, a distance between a boundary line between the first region 100 and the second region 200 and an edge of the touch screen is less than 10 mm, to ensure that compressive deformation is generated in the first region 100 and stretching deformation is generated in the second region 200 in a case that touch pressure is applied onto the surface of the touch screen. This is not intended to be limited, the distance may be however desired as long as it is ensured that the compressive deformation is generated in the first region 100 and the stretching deformation is generated in the second region 200 in a case that the pressure is applied onto the surface of the touch screen.

Figure 20:
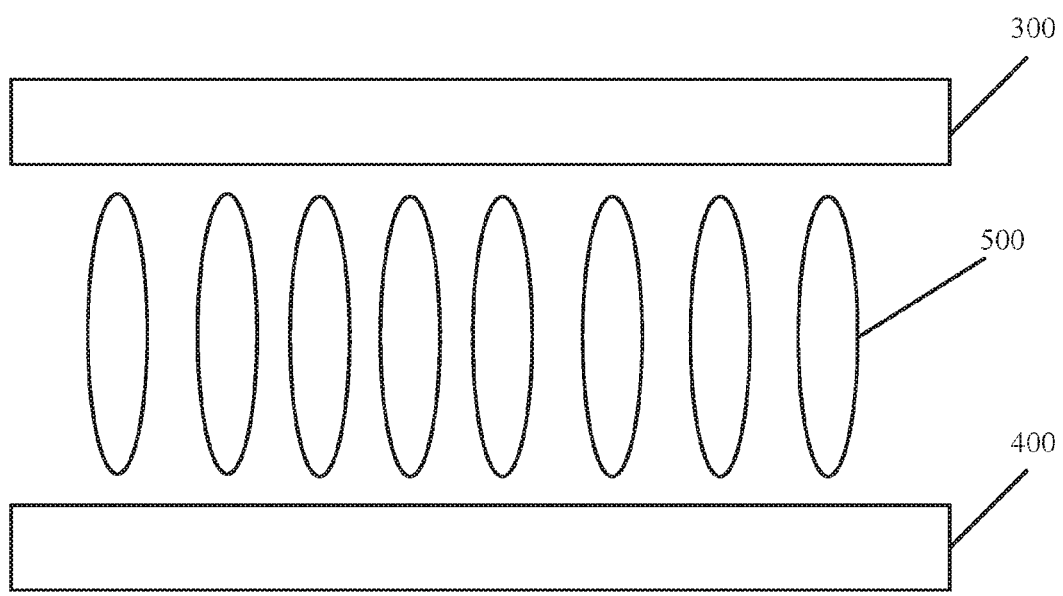
FIG. 20 is a sectional view of a structure of a touch screen according to an embodiment of the present disclosure.

Based on any one of the embodiments described above, in an embodiment of the present disclosure, as shown in FIG. 20, the touch screen further includes a color film substrate 300 and an array substrate 400 arranged opposite to each other, and a liquid crystal layer 500 arranged between the color film substrate 300 and the array substrate 400. In the embodiment of the present disclosure, the first pressure-sensitive structure and/or the second pressure-sensitive structure may be located on a surface of the color film substrate 300 facing away from the array substrate 400, or a surface of the color film substrate 300 facing towards the array substrate 400. Alternatively, the first pressure-sensitive structure and/or the second pressure-sensitive structure may be located on a surface of the array substrate 400 facing towards the color film substrate 300, or a surface of the array substrate 400 facing away from the color film substrate 300, which is not limited in the present disclosure, as the case may be.

Based on any one of the embodiments described above, in an embodiment of the present disclosure, each of the strain sensors in the first pressure-sensitive structure and/or the second pressure-sensitive structure is made of a transparent conductive material. In another embodiment of the present disclosure, each of the strain sensors in the first pressure-sensitive structure and/or the second pressure-sensitive structure is made of a nontransparent conductive material. It should be noted that, in a case that each of the strain sensors in the first pressure-sensitive structure and/or the second pressure-sensitive structure is made of a nontransparent conductive material, the strain sensors are located in a light-shielding region of the touch screen, to avoid an influence of the strain sensors on transmittance of the touch screen. Optionally, the strain sensor is made of an elemental metal or an alloy composed of at least two types of metal or a semiconductor material. More optionally, the metal is Mo, Al, Ni or Cu; and the semiconductor material is amorphous silicon, polysilicon or indium gallium zinc oxide, which is not limited in the present disclosure, as the case may be.

In general, in a case that the pressure is applied onto the surface of the touch screen according to the embodiments of the present disclosure, the compressive deformation is detected by the first strain sensor 1 located in the first region 100, and the stretching deformation is detected by the second strain sensor 2 located in the second region 200, and the voltage of the common terminal of the first strain sensor 1 and the second strain sensor 2 is detected by the first voltage detector 6, to obtain the amount of the pressure applied onto the surface of the touch screen. It can be seen that, the touch screen according to the embodiments of the present disclosure can not only detect a change in the pressure on the surface of the touch screen, but also continuously detect the amount of the pressure on the surface of the touch screen. In this way, the problems in the conventional technology are solved that the pressure-sensitive touch screen can only detect a change in the pressure on the surface of the pressure-sensitive touch screen and can not continuously detect the amount of the pressure on the surface of the pressure-sensitive touch screen, and an application range of the pressure-sensitive touch screen is extended and the development of the pressure-sensitive touch screen is prompted.

Various parts of the specification are described in a progressive way, and each part lays emphasis on differences from other parts. For the same or similar parts between various parts, one may refer to the description of other parts.

According to the above description of the disclosed embodiments, those skilled in the art can implement or practice the present disclosure. Many changes to these embodiments are apparent for those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A touch screen comprising at least one first pressure-sensitive structure, wherein the at least one first pressure-sensitive structure each comprises:
   a first strain sensor located in a first region;
   a second strain sensor located in a first sub-region or a second sub-region of a second region, wherein the first region is surrounded by the second region, and a distance between a boundary line between the first region and the second region and an edge of the touch screen is less than a preset value, wherein the preset value is configured to provide compressive deformation generation in the first region and stretching deformation generation in the second region in a case where touch pressure is applied onto a surface of the touch screen;
a first power supply configured to provide a drive signal to the first strain sensor and the second strain sensor, wherein a first terminal of the first power supply is electrically connected to one terminal of the first strain sensor away from the second strain sensor, and a second terminal of the first power supply is electrically connected to one terminal of the second strain sensor away from the first strain sensor; and
a first voltage detector configured to detect a voltage of a common terminal of the first strain sensor and the second strain sensor, wherein a first terminal of the first voltage detector is electrically connected to the common terminal of the first strain sensor and the second strain sensor, a second terminal of the first voltage detector is electrically connected to a first preset voltage, and the touch screen is configured to detect pressure on the surface of the touch screen based on the voltage of the common terminal of the first strain sensor and the second strain sensor detected by the first voltage detector; and, wherein
the first sub-region and the second sub-region arranged opposite to each other in a first direction,
the second region further comprises a third sub-region and a fourth sub-region arranged opposite to each other in a second direction, wherein the first direction is perpendicular to the second direction,
an angle between a main strain direction of the second strain sensor and the second direction ranges from 45 degrees to 135 degrees, inclusively.

2. The touch screen according to claim 1, wherein the angle between the main strain direction of the second strain sensor and the second direction is equal to 90 degrees.

3. The touch screen according to claim 1, wherein the at least one first pressure-sensitive structure each further comprises:
a third strain sensor located in the first region, wherein the third strain sensor is electrically connected to the terminal of the second strain sensor away from the first strain sensor; and
a fourth strain sensor located in the first sub-region or the second sub-region of the second region, wherein a first terminal of the fourth strain sensor is electrically connected to one terminal of the third strain sensor away from the second strain sensor, and a second terminal of the fourth strain sensor is electrically connected to the terminal of the first strain sensor away from the second strain sensor, an angle between a main strain direction of the fourth strain sensor and the second direction ranges from 45 degrees to 135 degrees, inclusively; and, wherein
the first preset voltage is a voltage of a common terminal of the third strain sensor and the fourth strain sensor, the first voltage detector is configured to detect a voltage difference between the voltage of the common terminal of the first strain sensor and the second strain sensor and the voltage of the common terminal of the third strain sensor and the fourth strain sensor.

4. The touch screen according to claim 3, wherein the second strain sensor is located in the first sub-region, and the fourth strain sensor is located in the second sub-region.

5. The touch screen according to claim 3, wherein both the second strain sensor and the fourth strain sensor are located in the first sub-region; or both the second strain sensor and the fourth strain sensor are located in the second sub-region.

6. The touch screen according to claim 3, wherein the touch screen comprises a plurality of first pressure-sensitive structures arranged side by side in the second direction, and wherein the second strain sensor is one of a plurality of second strain sensors and the fourth strain sensor is one of a plurality of fourth stain sensors, wherein each of the plurality of first pressure-sensitive structures include in a same sub-region a respective one of the plurality of first strain sensors and a respective one of the plurality of second strain sensors.

7. The touch screen according to claim 6, wherein a first group of the plurality of the second strain sensors and a first group of the plurality of the fourth strain sensors are located in the first sub-region, and a second group of the plurality of second strain sensors and a second group of the plurality of fourth strain sensors are located in the second sub-region.

8. The touch screen according to claim 7, wherein the total number of the second strain sensors in the first group of the plurality of strain sensors is the same as the total number of second strain sensors in the second group of the plurality of strain sensors, and the total number of fourth strain sensors in the first group of the plurality of fourth strain sensors is the same as the total number of fourth strain sensors in the second group of the plurality of fourth strain sensors, and wherein respective ones of the second strain sensors in the first group of the plurality of second strain sensors have a one-to-one correspondence with respective ones of the second strain sensors in the second group of the plurality of second strain sensors, and respective ones of the fourth strain sensors in the first group of the plurality of fourth strain sensors have a one-to-one correspondence with respective ones of the fourth strain sensors in the second group of the plurality of fourth strain sensors.

9. The touch screen according to claim 8, wherein a distance between the first sub-region and the second sub-region is less than a distance between the third sub-region and the fourth sub-region.

10. The touch screen according to claim 1, further comprising:
a color film substrate and an array substrate arranged opposite to each other; and
a liquid crystal layer arranged between the color film substrate and the array substrate.

11. The touch screen according to claim 1, wherein the preset value is 10 mm.

12. The touch screen according to claim 1, wherein each of the first strain sensors and the second strain sensors in the at least one first pressure-sensitive structure is made of a transparent conductive material, and the strain sensor is made of an elemental metal or an alloy composed of at least two types of metal or a semiconductor material.

13. The touch screen according to claim 1, wherein each of the first strain sensors and the second strain sensors in the at least one first pressure-sensitive structure is made of a nontransparent conductive material, the strain sensors are located in a light-shielding region of the touch screen, and the strain sensor is made of an elemental metal or an alloy composed of at least two types of metal or a semiconductor material.

14. The touch screen according to claim 9, further comprising: at least one second pressure-sensitive structure, wherein the at least one second pressure-sensitive structure each comprises:
a fifth strain sensor located in the first region;

a sixth strain sensor located in the third sub-region or the fourth sub-region;

a second power supply configured to provide a drive signal to the fifth strain sensor and the sixth strain sensor, wherein a first terminal of the second power supply is electrically connected to one terminal of the fifth strain sensor away from the sixth strain sensor, a second terminal of the second power supply is electrically connected to one terminal of the sixth strain sensor away from the fifth strain sensor; and a second voltage detector configured to detect a voltage of a common terminal of the fifth strain sensor and the sixth strain sensor, wherein a first terminal of the second voltage detector is electrically connected to the common terminal of the fifth strain sensor and the sixth strain sensor, a second terminal of the second voltage detector is electrically connected to a second preset voltage, and the touch screen is further configured to detect the pressure on the surface of the touch screen based on the voltage detected by the second voltage detector; and, wherein an angle between a main strain direction of the sixth strain sensor and the first direction ranges from 45 degrees to 135 degrees, inclusively.

15. The touch screen according to claim 14, wherein the at least one second pressure-sensitive structure each further comprises:

a seventh strain sensor located in the first region, wherein the seventh strain sensor is electrically connected to one terminal of the sixth strain sensor away from the fifth strain sensor; and an eighth strain sensor located in the third sub-region or the fourth sub-region, wherein a first terminal of the eighth strain sensor is electrically connected to one terminal of the seventh strain sensor away from the sixth strain sensor, and a second terminal of the eighth strain sensor is electrically connected to one terminal of the fifth strain sensor away from the sixth strain sensor; and, wherein the second preset voltage is a voltage of a common terminal of the seventh strain sensor and the eighth strain sensor, the second voltage detector is configured to detect a voltage difference between the voltage of the common terminal of the fifth strain sensor and the sixth strain sensor, and the voltage of the common terminal of the seventh strain sensor and the eighth strain sensor.

16. The touch screen according to claim 15, wherein both the sixth strain sensor and the eighth strain sensor are located in the third sub-region; or both the sixth strain sensor and the eighth strain sensor are located in the fourth sub-region.

17. The touch screen according to claim 15, wherein the sixth strain sensor is located in the third sub-region, and the eighth strain sensor is located in the fourth sub-region; or the sixth strain sensor is located in the fourth sub-region, and the eighth strain sensor is located in the third sub-region.

18. The touch screen according to claim 14, wherein the touch screen comprises a plurality of second pressure-sensitive structures, and the plurality of second pressure-sensitive structures are arranged side by side in the first direction.

* * * * *